United States Patent
Kusase

(10) Patent No.: US 6,707,184 B2
(45) Date of Patent: Mar. 16, 2004

(54) PERMANENT MAGNET TYPE AC GENERATOR HAVING SHORT-CIRCUITING CONTROL CIRCUIT

(75) Inventor: Shin Kusase, Obu (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/950,785

(22) Filed: Sep. 13, 2001

(65) Prior Publication Data

US 2002/0047353 A1 Apr. 25, 2002

(30) Foreign Application Priority Data

Sep. 14, 2000 (JP) .................... 2000-280491

(51) Int. Cl.⁷ .................... H02K 11/00; H02K 7/00
(52) U.S. Cl. .................... 310/68 B; 310/68 R; 310/66; 310/40 R
(58) Field of Search .................... 310/68 B, 68 R, 310/66, 40 R, 10

(56) References Cited

U.S. PATENT DOCUMENTS

| | | | | |
|---|---|---|---|---|
| 5,311,392 A | * | 5/1994 | Kinney et al. | 361/93.2 |
| 5,448,141 A | * | 9/1995 | Kelley et al. | 318/254 |
| 5,475,290 A | * | 12/1995 | Tani et al. | 318/434 |
| 5,644,238 A | * | 7/1997 | Seifert et al. | 324/424 |
| 5,814,957 A | * | 9/1998 | Yoshida | 318/439 |
| 6,545,443 B2 | * | 4/2003 | Kushida | 318/727 |
| 6,603,649 B1 | * | 8/2003 | Muller et al. | 361/93.3 |

* cited by examiner

*Primary Examiner*—Tran Nguyen
*Assistant Examiner*—Pedro J. Cuevas
(74) *Attorney, Agent, or Firm*—Posz & Bethards, PLC

(57) ABSTRACT

A vehicle AC generator for charging a battery includes a rotor having a permanent magnet, a stator having an armature winding, a rectifier and a short-circuit unit. The short-circuit unit intermittently short-circuits the armature winding. The armature winding is set to generates a no-load voltage that is lower than a terminal voltage of the battery when the armature winding is not connected to loads. The short-circuit unit intermittently short-circuits the armature winding to generates a fly back voltage that is higher than the terminal voltage of the battery when the armature winding is connected to the loads. Therefore, the output voltage of the permanent magnet type generator can be regulated without significant energy loss.

13 Claims, 3 Drawing Sheets

PERMANENT MAGNET TYPE AC GENERATOR HAVING SHORT-CIRCUITING CONTROL CIRCUIT

CROSS REFERENCE TO RELATED APPLICATION

The present application is based on and claims priority from Japanese Patent Application 2000-280491 filed Sep. 14, 2000, the contents of which are incorporated herein by reference.

BACKGROUND OF THE INVENTION

1. Field of the Invention

The present invention relates to a permanent magnet type vehicle AC generator to be mounted in a passenger car or a truck.

2. Description of the Related Art

In order to improve fuel consumption of a vehicle, it is important to reduce energy loss of a vehicle AC generator. A permanent magnet type AC generator that has a permanent magnet is suitable because it does not have a field coil that consumes electric power for supplying field current.

However, it is difficult to control the output voltage of such a permanent magnet type AC generator without energy loss. A thyristor switching circuit has been used to short-circuit output terminals of an armature winding of the permanent magnet type AC generator to control the output voltage. However, energy loss due to short-circuit of the armature winding is considerably large.

SUMMARY OF THE INVENTION

Therefore, a main object of the invention is to provide an improved permanent magnet type AC generator having a voltage regulating system.

According to a main feature of the invention, a permanent magnet type vehicle AC generator for charging a battery includes a rotor having a permanent magnet, a stator having an armature winding, a rectifier and a control unit for short-circuiting the armature winding in synchronism with the rotation of the rotor. When the armature winding is not connected to a battery, the armature winding is not controlled by the control to generate a no-load voltage that is lower than a terminal voltage of the battery. On the other hand, when the armature winding is connected to the battery, the control unit intermittently short-circuits the armature winding to generate a regular voltage that is higher enough to charge the battery.

The armature winding may be comprised of a star-connected three phase windings having three output terminal ends. In this case, the control unit connects the neutral point of the three phase windings and the three output terminal ends through the rectifier. The armature winding may be comprised of a plurality of conductor segments having a rectangular cross-section connected each other to provide an armature winding of a very low armature resistance. The control unit is preferably comprised of an intermittent switch unit and a timing control unit that synchronizes the switching operation of the intermittent switch unit with rotation of said rotor.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A preferred embodiment of the invention is described with reference to the appended drawings.

Figure 1:
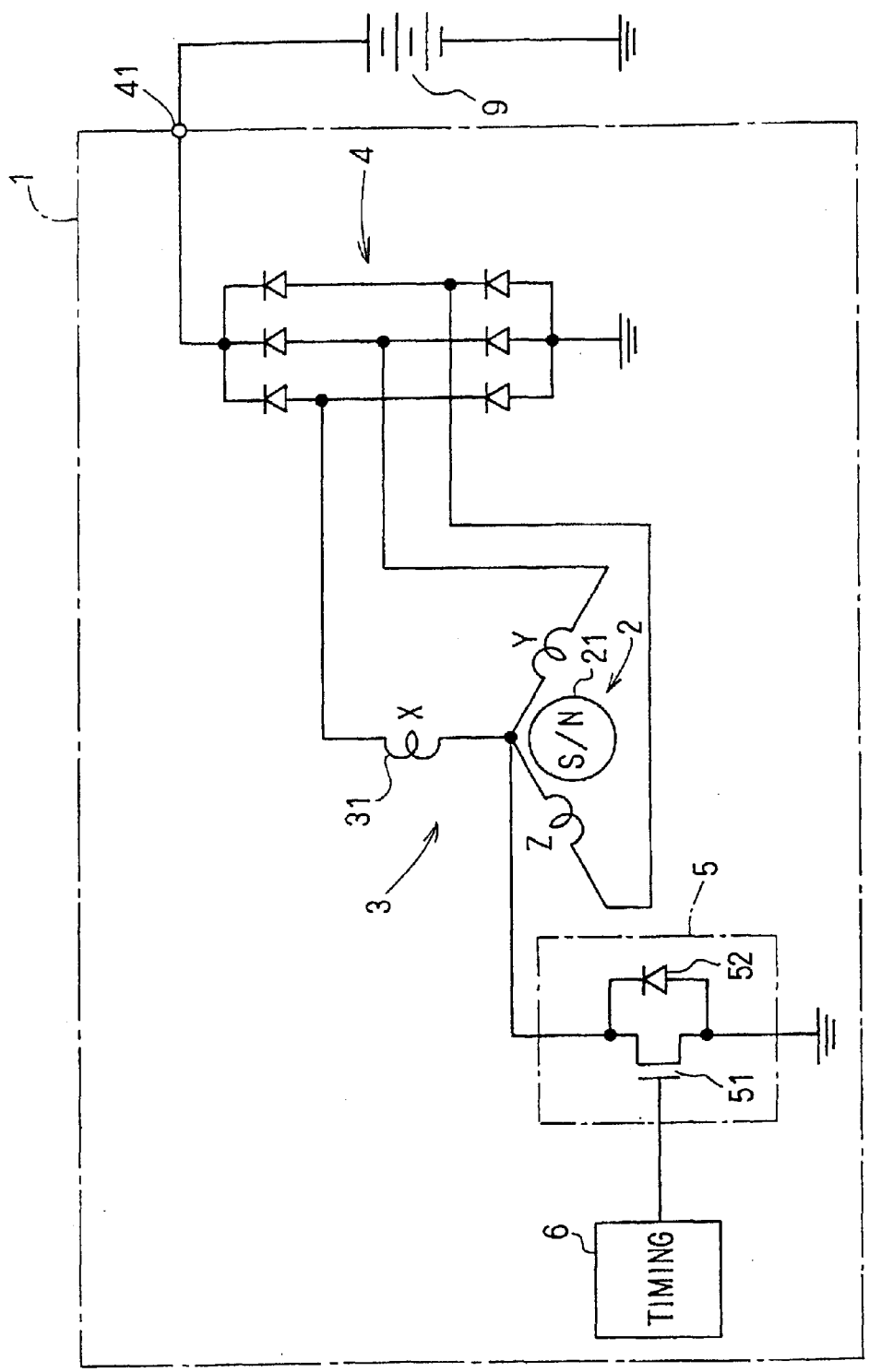
FIG. 1 is a circuit diagram of a permanent magnet type AC generator with a voltage regulating system according to a preferred embodiment of the invention mounted therein.

In FIG. 1, a permanent magnet type AC generator for a vehicle 1 is comprised of a permanent magnet rotor 2, a stator 3 having a star-connected armature winding 31 and a stator core 32, a rectifier unit 4 for converting AC power generated in the armature winding 31 into DC power to be charged to a battery 9, an intermittent switch unit 5 for intermittently short-circuiting the armature winding 31 and a timing control unit 6 for controlling timing of the intermittent switch unit 5.

The rotor 2 is comprised of a ferrite permanent magnet 21 and a pole core formed from a plurality of laminated iron sheets that prevent eddy current loss.

Figure 2:
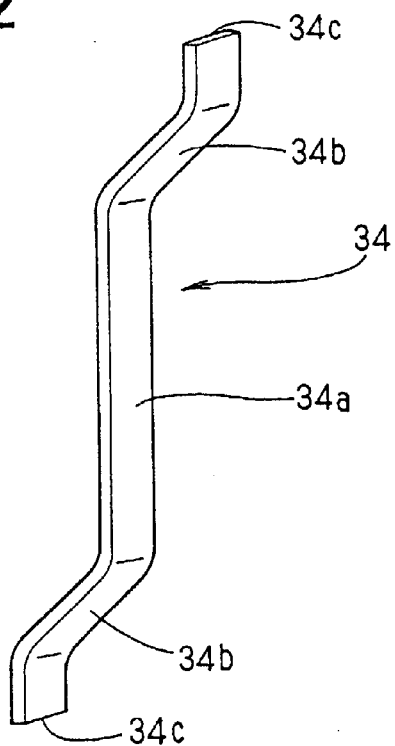
FIG. 2 is a perspective view of a conductor segment forming an armature winding of the permanent magnet type AC generator.
Figure 3:
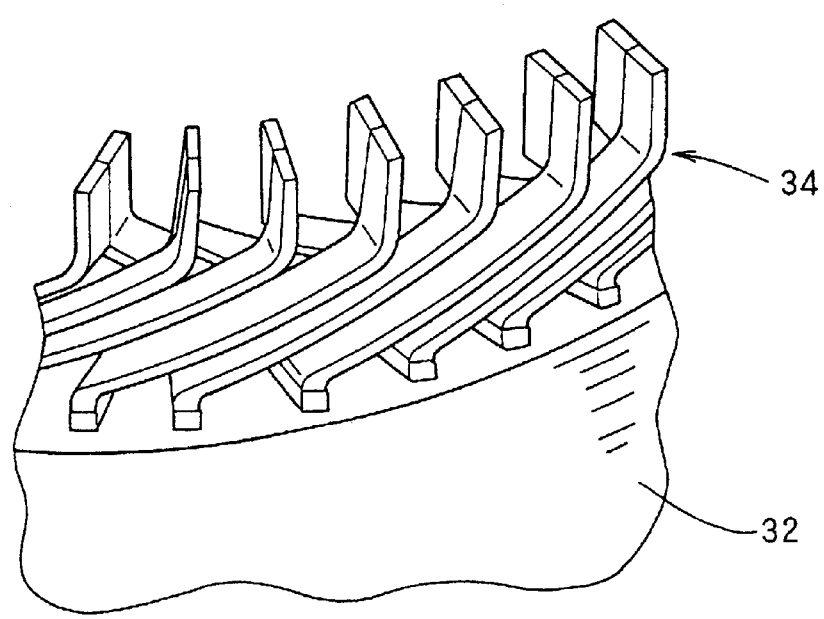
FIG. 3 is a fragmentary perspective view of a stator of the permanent magnet type AC generator.
Figure 4:
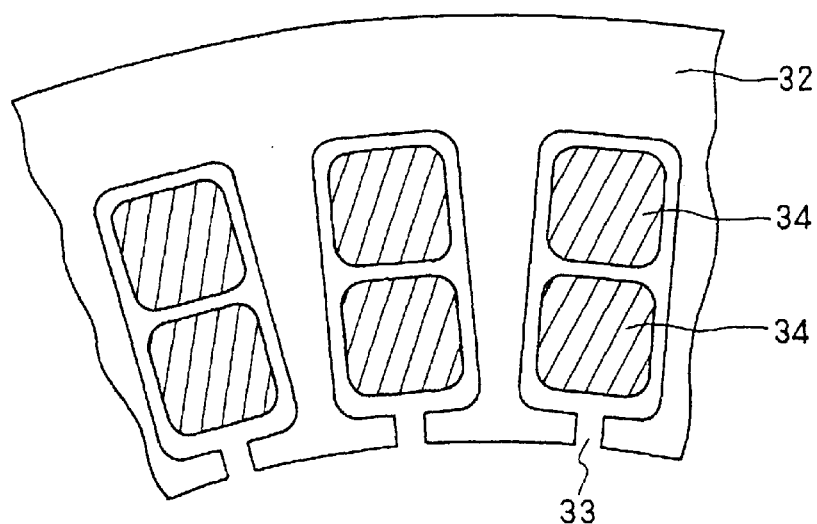
FIG. 4 is a schematic cross-sectional diagram of the stator shown in FIG. 3.

The armature winding 31 of the stator 3 has a small number of turns per pole, such as less than one turn per pole and very low resistance, so that the voltage induced therein is lower than a voltage of the battery 9 to prevent the battery 9 from overcharging. The armature winding 31 is comprised of a plurality of rectangular conductor segments 34, as shown in FIG. 2. The conductor segments are connected to each other into a Y-shape to form a star shape as shown. Each conductor segment 34 has a straight in-slot portion 34a to be inserted in a slot 33 of the stator core 32, inclined portions 34b that extend from the opposite ends of the straight in-slot portion, and opposite connection ends 34c to be connected to connection ends of other conductor segments 34. As shown in FIG. 4, the rectangular conductor segment 34 has sides that can be tightly fitted to each slot 33. Therefore, the ratio of the cross-sectional area of the conductor segment to the cross-sectional area of the slot (hereinafter referred to as the space factor) can be maximized so that the armature winding has a very low resistance, for example, about 1 mΩ

The rectifier unit 4 is comprised of a three-phase full-wave bridge circuit of three negative side diodes and three positive side diodes and is connected between the armature winding 3 and an output terminal 41 of the AC generator 1, which is connected to the battery 9.

The intermittent switch unit 5 is comprised of a MOSFET 51 and a diode 52. The timing control unit 6 synchronizes the switching operation of the MOSFET 51 with rotation of the rotor 2. In more detail, the intermittent switch unit 5 intermittently connects the neutral point of the armature winding 31 to a ground so that the armature winding 31 can be short-circuited cyclically via the three negative side diodes of the rectifier unit 4 and the MOSFET 51. Accordingly, a fly back voltage is induced in each phase coil of the armature winding 31, which is supplied from the terminal 41.

When no load is connected to the armature winding 31, the intermittent switch unit 5 is controlled to turn off, and the output voltage at the output terminal 41 is lower than the battery terminal voltage.

On the other hand, when the battery 9 or other vehicle load is connected, the intermittent switch unit 5 is controlled by the timing control unit 6 to intermittently turn on to generate the fly back voltage that is higher than the battery voltage.

Figure 5:
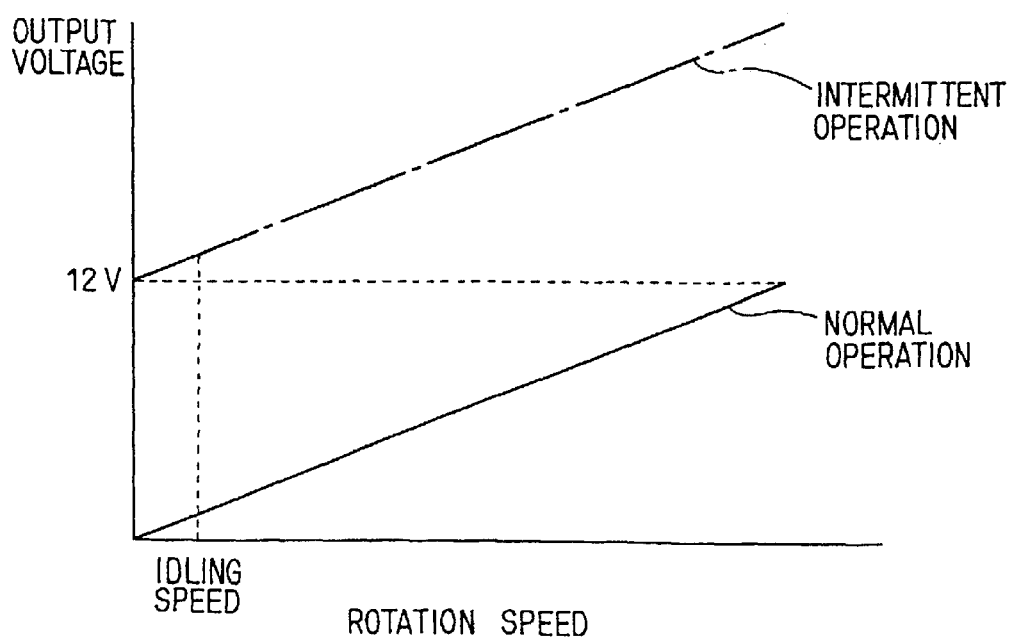
FIG. 5 is a graph showing a relationship between the output voltage of the permanent magnet type AC generator and the rotation speed thereof.

As shown in FIG. 5, when the intermittent switch unit 5 does not operate, or is off, the output voltage is lower than the battery voltage (e.g. 12 V). On the other hand, when the intermittent switch unit operates to intermittently turn on the MOSFET 51, the output voltage increases to a voltage higher than the battery voltage.

When the MOSFET 51 turns on, a short-circuit current flows through the MOSFET 51 and the armature winding 31. The MOSFET 51 turns off immediately thereafter, and the short-circuit current is supplied to the output terminal 41. Since the resistance of the armature winding is very low, the short-circuit current causes little internal energy loss.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle AC generator for charging a battery comprising:
    a rotor having a permanent magnet;
    a stator having an armature winding for generating AC power, said armature winding having a number of turns;
    a rectifier for converting said AC power of said armature winding to DC power;
    means for short-circuiting said armature winding to provide short-circuit current in said armature winding when said armature winding is connected to said battery through said rectifier; and
    means for interrupting the short-circuit current, wherein the means for interrupting the short-circuit current cyclically interrupts the short-circuit current to generate fly back voltage for charging said battery and continuously interrupts the short-circuit current to avoid charging the battery, and wherein the number of turns is such that the generator generates a no-load voltage that is lower than a terminal voltage of said battery when said rotor rotates at a regular speed and said means for interrupting the short-circuit current continuously interrupts the short-circuit current.

2. The vehicle AC generator as claimed in claim 1, wherein
    said armature winding is comprised of star-connected three phase windings having three output terminal ends, and
    said means for short-circuiting connects the neutral point of said three phase windings and said three output terminal ends through said rectifier.

3. The vehicle AC generator as claimed in claim 2, wherein
    said armature winding comprises a plurality of conductor segments having a rectangular cross-section connected each other.

4. The vehicle AC generator as claimed in claim 1, wherein said means for interrupting comprises a timing control unit for synchronizing the operation of said short-circuiting means with rotation of said rotor.

5. A vehicle AC generator for charging a battery comprising:
    a rotor having a permanent magnet;
    a stator having a three-phase star-connected armature winding, wherein the winding includes a neutral point;
    a three-phase, full-wave rectifier having input terminals connected to said armature winding and output terminals, one of which is connected to a ground;
    a switch, which is connected between said neutral point and said ground, for short-circuiting said armature winding to provide short-circuit current in said armature winding when said armature winding is connected to said battery through said rectifier; and
    a switch control means for controlling said switch to interrupts the short-circuit current wherein the switch control means cyclically interrupts the short-circuit current to generate fly back voltage for charging said battery and continuously interrupts the short-circuit current to avoid charging said battery, wherein the rotor and the stator are designed to generate a no-load voltage that is lower than a terminal voltage of said battery when said switch control means continuously interrupts the short-circuit current.

6. A vehicle AC generator for charging a battery comprising:
    a rotor having a permanent magnet as a field supplying means;
    a stator having an armature winding for generating AC power;
    a rectifier for converting said AC power of said armature winging to DC power;
    a short circuit switch disposed on a short circuit path of the armature winding for short-circuiting said armature winding; and
    means for controlling the short-circuit switch, wherein:
        the rotor has no field supplying means other than permanent magnets including the permanent magnet;
        the rotor, the stator and the rectifier are designed to generate no-load voltage when the short-circuit switch continuously opens the short-circuit path, the no-load voltage being lower than the terminal voltage of the battery;
        the rotor, the stator and the rectifier are designed to generate fly back voltage when the short-circuit switch cyclically closes the short-circuit path, the fly back voltage being higher than the terminal voltage of the battery;
        the means for controlling the short-circuit switch controls the short-circuit switch to continuously open the short circuit path in order to avoid charging the battery; and
        the means for controlling the short-circuit switch controls the short-circuit switch to cyclically close the short circuit path in order to charge the battery.

7. The vehicle AC generator as claimed in claim 6, wherein the armature winding has a number of turns that is adjusted to generate the no-load voltage when the short-circuit switch continuously opens the short-circuit path.

8. The vehicle AC generator as claimed in claim 7, wherein the number of turns is less than a number of turns that enables the armature winding to generate voltage higher than the voltage of the battery when the short-circuit switch continuously opens the short-circuit path.

9. The vehicle AC generator as claimed in claim 6, wherein the armature winding comprises a plurality of conductor segments having a rectangular cross-section connected each other.

10. The vehicle AC generator as claimed in claim 6, wherein the armature winding is comprised of star-connected three phase windings having three output terminal ends and a neutral point, and the short-circuit switch is connected to the neutral point for short-circuiting the three phase windings.

11. The vehicle AC generator as claimed in claim 10, wherein the rectifier is comprised of a three-phase full wave bridge circuit of diodes, and the short-circuit switch is connected between the neutral point and the negative side of the three-phase full wave bridge circuit.

12. The vehicle AC generator as claimed in claim 6, wherein the rectifier is comprised of a two-terminal rectifier element that has a terminal connected to the battery and a terminal connected to the armature winding.

13. The vehicle AC generator as claimed in claim 6, wherein the short-circuit switch comprises a MOSFET that has a gate terminal connected with the controlling means, thereby opening the short-circuit path when the controlling means turns of the MOSFET.

* * * * *